United States Patent [19]
Potier

[11] Patent Number: 5,170,018
[45] Date of Patent: Dec. 8, 1992

[54] METHOD AND APPARATUS FOR TUBE-WAVE SUPPRESSION

[75] Inventor: Paul A. Potier, Houston, Tex.

[73] Assignee: Exxon Production Research Company, Houston, Tex.

[21] Appl. No.: 656,928

[22] Filed: Feb. 19, 1991

[51] Int. Cl.⁵ ............................................. G01V 1/00
[52] U.S. Cl. .................................... 181/101; 181/102; 181/104; 181/401; 367/31; 367/75; 73/151
[58] Field of Search .............. 181/101, 401, 102, 104; 367/31, 75; 73/151, 152

[56] References Cited

U.S. PATENT DOCUMENTS

| | | | |
|---|---|---|---|
| 215,593 | 5/1879 | Eames et al. | 181/258 |
| 3,960,239 | 6/1976 | Frochaux et al. | 181/49 |
| 4,124,091 | 11/1978 | Mizusawa | 181/231 |
| 4,184,564 | 1/1980 | Trainer | 181/230 |
| 4,415,998 | 11/1983 | Blizard | 367/25 |
| 4,471,475 | 9/1984 | Brunson | 367/161 |
| 4,550,799 | 11/1985 | Flugger | 181/244 |
| 4,809,243 | 2/1989 | Bledsoe et al. | 367/154 |
| 4,815,050 | 3/1989 | Kurz | 367/141 |
| 4,817,755 | 4/1989 | Gildas | 181/106 |
| 4,821,838 | 4/1989 | Chen | 181/175 |
| 4,858,718 | 8/1989 | Chelminski | 181/106 |
| 4,869,338 | 9/1989 | Wiggins et al. | 181/106 |
| 4,872,526 | 10/1989 | Wignall et al. | 181/102 |
| 4,993,001 | 2/1991 | Winbow et al. | 367/144 |

Primary Examiner—J. Woodrow Eldred
Attorney, Agent, or Firm—Darcell Walker

[57] ABSTRACT

A device and method for suppressing acoustic tube wave noise in a borehole. The device comprises an absorptive material that is positioned in a borehole so that the device will encounter and absorb the tube waves before the waves are detected by receivers. The device can also contain a housing in which to place the absorptive material. The housing can also be surrounded by an absorptive material to help absorb energy reflecting off the borehole wall.

4 Claims, 7 Drawing Sheets

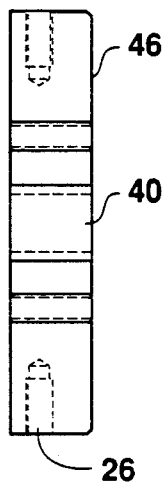
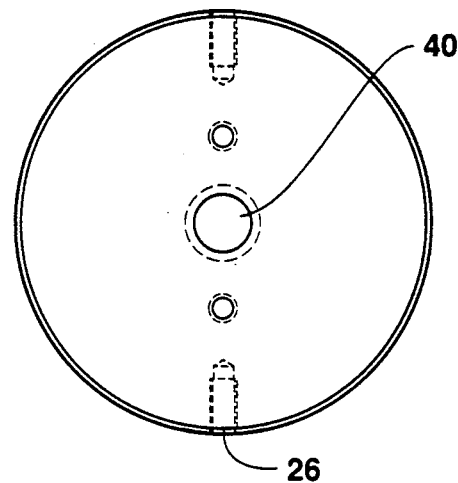
FIG. 3a  FIG. 3b
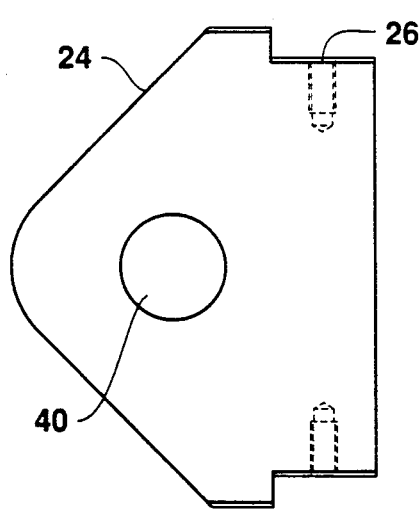
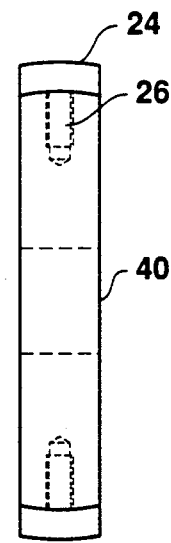
FIG. 4a  FIG. 4b

METHOD AND APPARATUS FOR TUBE-WAVE SUPPRESSION

FIELD OF THE INVENTION

The present invention relates to a method and device for suppressing acoustic noise in a borehole.

BACKGROUND OF THE INVENTION

Borehole seismic surveys are conducted for the purpose of mapping subsurface geologic structures. In a typical borehole seismic survey, a source is placed in a borehole at a selected depth and excited in order to produce acoustic waves in the adjacent geological formations. Sensors are usually placed at the earth's surface or at selected depths in the same or another borehole in order to detect the acoustic signals after they have propagated through and been reflected from geological formations.

During the seismic surveys, acoustic waves generated by the source also propagate vertically in the receiver borehole in the form of tube waves. These tube waves are generated when incident energy encounters the top and bottom of the borehole and/or any impedance contrasts along the length of the borehole. The tube waves interfere with the acoustic signals in the borehole and surrounding formation. These tube waves are also detected by the sensors. A problem in borehole seismic surveys is distinguishing the desired acoustic waves detected by the sensors in the borehole from the undesired tube waves.

Some efforts have been made to solve the problem of tube waves interfering with the desired acoustic waves. One conventional approach to solving this problem has been to use inflatable bladders in the source borehole. These bladders are placed below and possibly above the source as disclosed in a Chelminski patent, U.S. Pat. No. 4,858,718. Bolt Technology Corporation implements the method described in the Chelminski patent. The bladder is made of rubber or a polymeric expandable material and uses a compressed gas such as air or nitrogen to fill the bladder downhole. This device must use a pressure regulator valve and relief valve to control the pressure inside the bladder. The bladder maintains near equilibrium with the borehole fluid pressure. Also, the device must have either a compressed gas canister or a surface compressor with an umbilical cable down to the bladder to inflate the bladder. Bolt's European Patent Application No. 88103279.1 states that its suppressor has an axial length of at least "about 5 times its external diameter" of the device which would make its length less than 5 feet.

Gildas U.S. Pat. No. 4,817,755 discloses a device designed to couple source energy to the borehole wall in downhole shooting. The device uses metal canisters above and below an impulsive source. These canisters are filled with a plastic foam material to help attenuate the vertical component of the seismic energy. The canisters must be remotely controlled from the surface. Also, these canisters spool out primacord that is used as a source.

Both of the aforementioned approaches use mechanical devices to attempt to minimize tube wave energy. To avoid the complexity and unreliability of having mechanically or pneumatically activated devices downhole, a means of tube wave suppression is needed in either or both the source and receiver holes that will be cost effective, reliable and easy to implement.

SUMMARY OF THE INVENTION

The present invention provides a method and device for suppression of tube waves in a borehole. A absorptive material that has limited compressibility and is capable of absorbing acoustic signals can be adapted to be placed in a borehole at a location between the borehole entry point of the tube waves that are generated by the source and the detectors in the borehole. When such material is deployed in a borehole, as the tube waves move vertically toward the detectors, the waves encounter the absorptive material and are absorbed by the absorptive material. The material can also be adapted to be placed in the source borehole above and/or below the source.

This invention has several features that provide advantages over currently used devices. This invention is passive, requiring no umbilical cord or mechanical devices of any kind as do the Gildas and Chelminski devices. It is, therefore, inherently more reliable and very cost effective to use. This invention may be designed with no metal components in order to reduce ringing effects of sound traveling through it. Non-metallic materials also make the device light enough for easy implementation at the borehole, which also differs from the Gildas and Chelminski devices. The ability to vary the diameter of the inventive device by surrounding the device housing with absorptive material provides flexibility not available in other devices. The invention can also have a modular implementation in that housing sections containing absorptive materials may be concatenated together for any reasonable length in any configuration. The advantage of adding housing sections allows a crew to custom fit the length of the device to the dominant frequency band in the tube wave. The lower the dominant frequency, the longer the device needs to be to attenuate the tube wave.

BRIEF DESCRIPTION OF THE DRAWINGS

FIG. 2b Top cross-section view of the preferred embodiment of the device using cork discs.

FIG. 3a Side cross-section view of the plug.

FIG. 3b Top cross-section view of the plug.

FIG. 4a Side cross-section view of the tab.

FIG. 4b Top cross-section view of the tab.

DETAILED DESCRIPTION OF THE PREFERRED EMBODIMENTS

Figure 1:
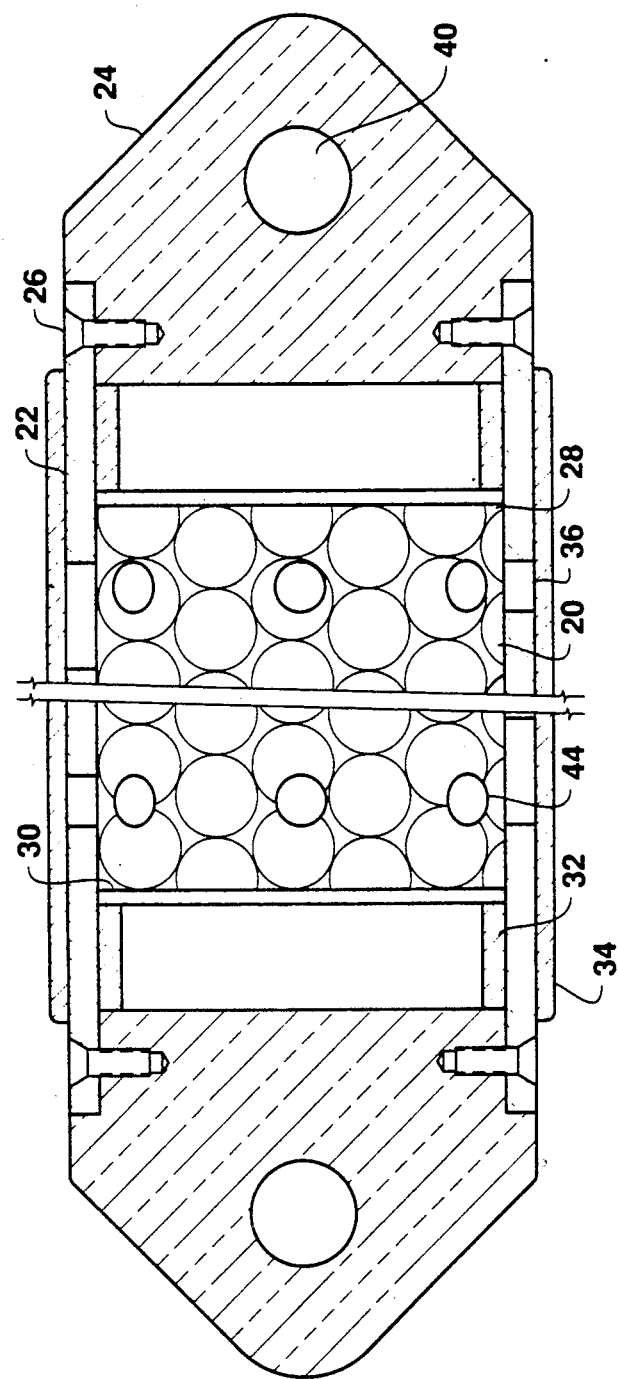
FIG. 1 Side cross-section view of the preferred embodiment of the device using cork balls.
Figure 5:
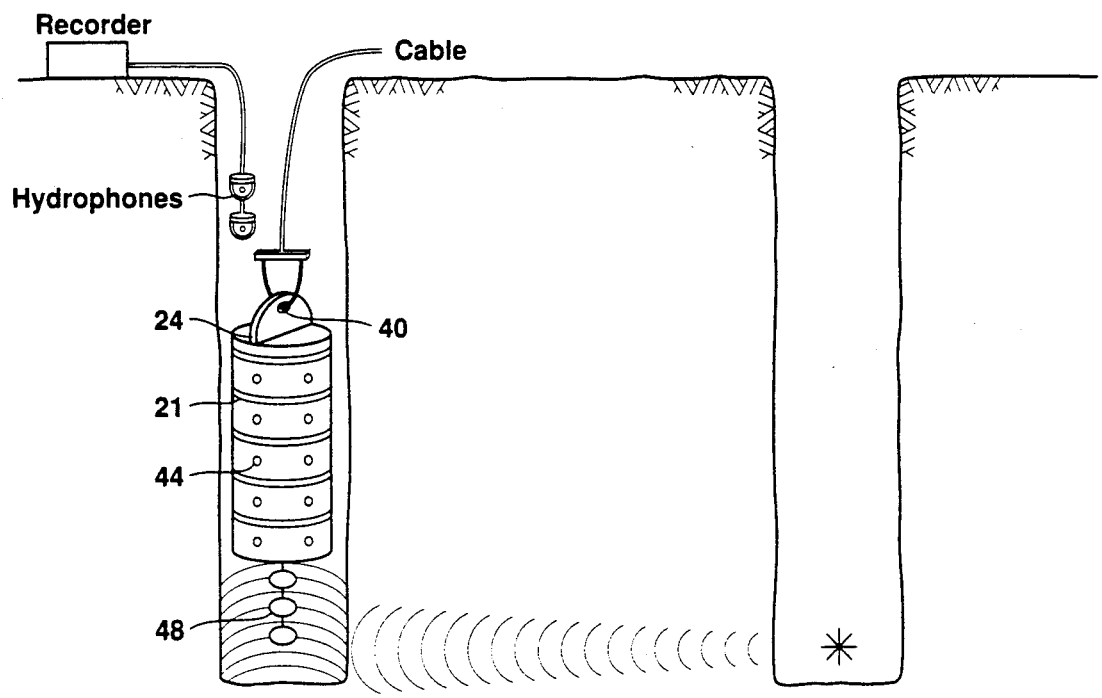
FIG. 5 Preferred implementation of the device in the borehole.

Referring to FIG. 1, one preferred embodiment comprises a non-metallic housing made of a 20-foot length of Chlorinated Polyvinyl Chloride (CPVC) pipe 22 that houses cork balls 20. In this preferred embodiment, the CPVC pipe housings 22 themselves have equally spaced rows of ½ inch diameter holes 44 drilled down the length of each housing to present a less homogeneous material for sound propagation through the housing. CPVC (schedule 40, grade 1) pipe is preferrably used for its strength and high temperature performance characteristics. Referring to FIGS. 4a and 4b, attached to each end of the housing is a tab 24 made of this same CPVC material that allows attachment to other housing sections. In FIG. 1, cork balls 20 are packed in the housing 22. The tabs 24 are attached to the housing by screws 26. Furthermore, the tabs do not completely seal the housing thereby allowing fluid to flow through the housing and also preventing pressure from building up in the housing. Plugs in FIGS. 3a and 3b can also be used in the same manner as the tabs. This tab is also used to attach a means for suspending the cable in the borehole. Such suspending means could be a suspension cable as shown in FIG. 5. The embodiment containing the cork balls also has screens 30 to hold the cork balls in the housing. The outside of the housing is wrapped or surrounded with one or more ¼ inch cork sheets 34 to help absorb energy reflecting off the casing or borehole wall and to provide the capability to adjust the diameter of the device if desired. Lead weights 48 are attached to the lower end of the housing in order to enable the housing to sink into a fluid-filled borehole. These weights can be made of lead or a material that has a high density.

Figure 2B:
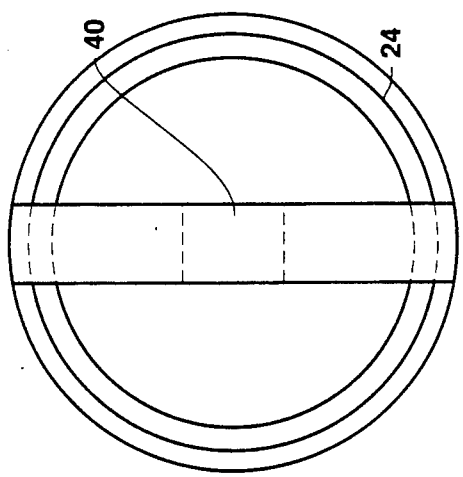
Figure 2A:
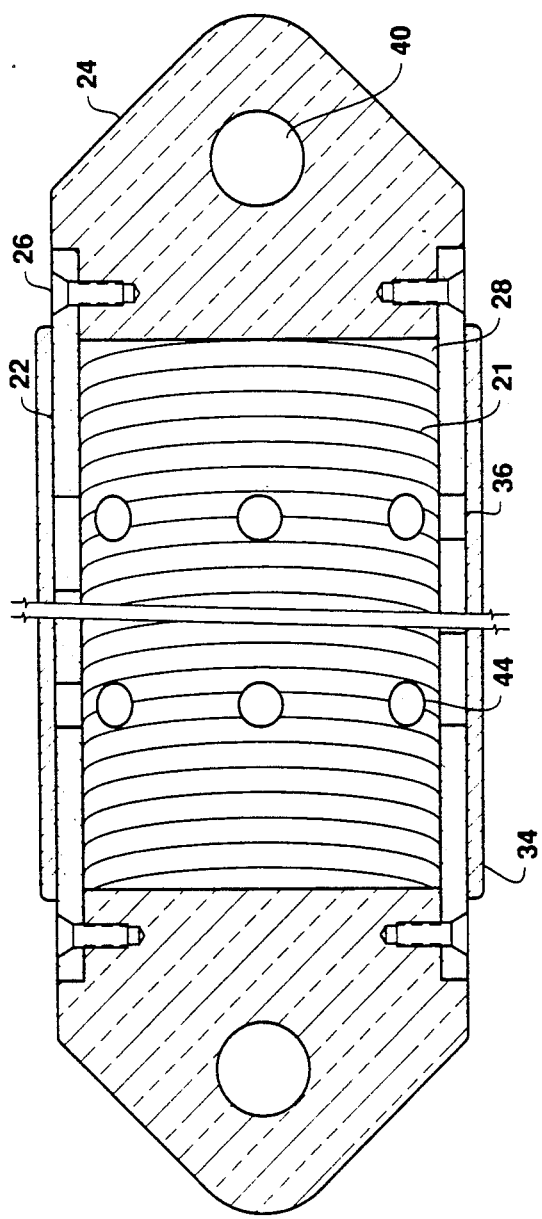
FIG. 2a Side cross-section view of the preferred embodiment of the device using cork discs.
Figure 9:
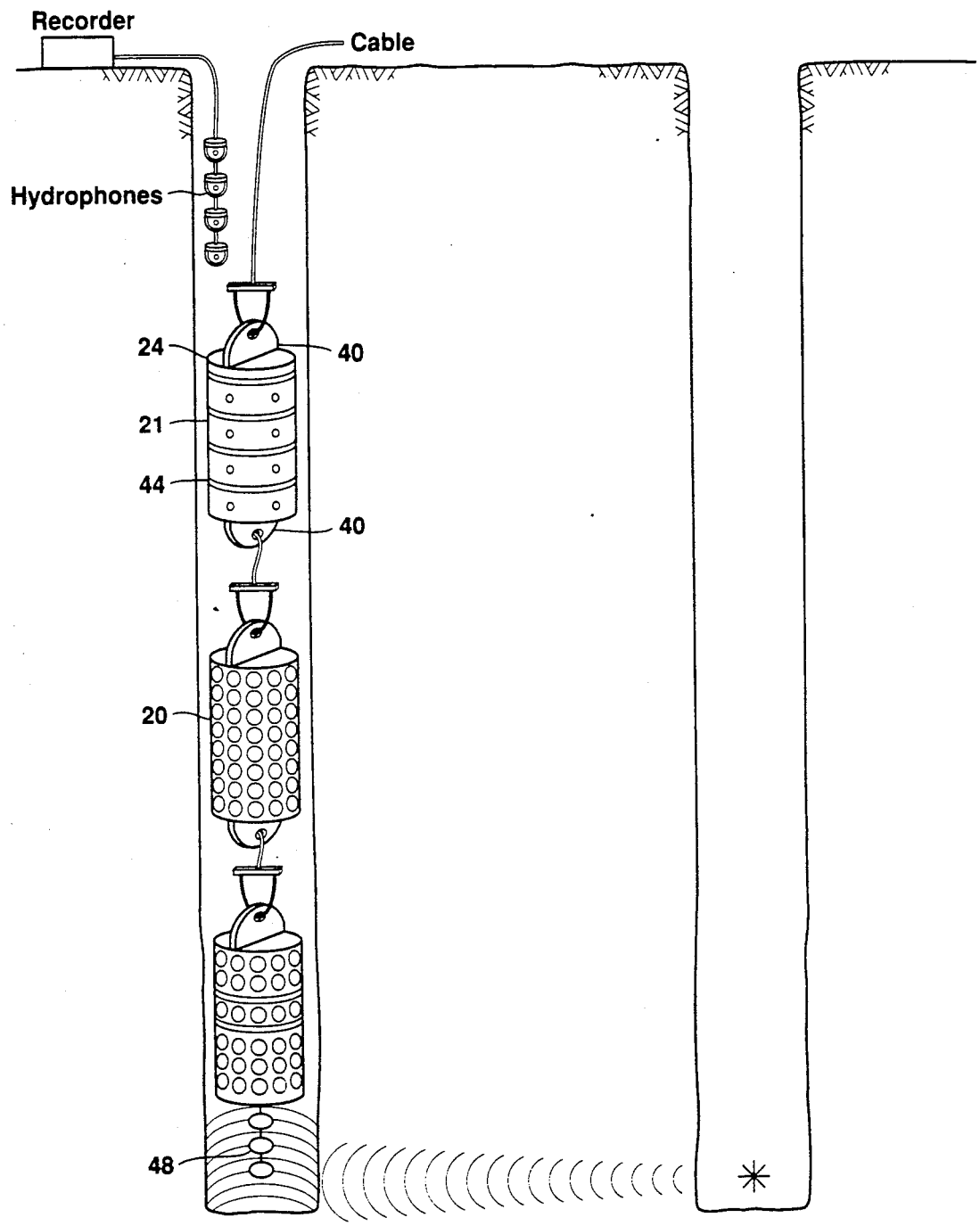
FIG. 9 Modular implementation of the device in the borehole using cork disks and cork balls together.

In another preferred embodiment, FIG. 2, the cork disks are made from expansion joint cork, federal specification HH-F-341F, Type 2 Class B. They are 2 inches to 4 inches in diameter. The disks are stacked in the CPVC pipe housing 22 over the length of the housing. Holes 44 are also drilled down the length of the housing as in the cork balls embodiment. Cork disks are packed the length of the housing. In another embodiment, cord disks and balls may both occupy the same housing (FIG. 9). A tab 24, made of CPVC material, is then attached to each end of the pipe housing by means such as screws 26 to secure the disks inside and to be used to attach a means for suspending the cable in the borehole. Such suspending means could be a suspension cable as shown in FIG. 5. In addition, weights 48 are attached to the lower end of the housing in order to enable the housing to sink into a fluid-filled borehole. As stated previously, these weights can be made of lead or a material that has a high density.

Referring to FIG. 9, the design can be modular in that pipe housings containing an absorptive material may be concatenated together for any reasonable length in any configuration. Generally, however, the device will be in the range of 10-100 feet in length. This could be done in order to attenuate the dominant frequency band in the tube wave. The lower the dominant frequency, the longer the device needs to be to attenuate the tube wave. An example of a modular implementation is shown in FIG. 9 as a 20-foot section of cork disks followed by a 20-foot section of cork balls, followed by a 20-foot section of cork disks and balls. Each section can be lowered into the hole individually, and sections may be easily added at the wellhead.

As previously mentioned, the cork 34 on the outside of the device can be added or subtracted in sheet layers to adjust the external diameter of the device to match the diameter of a borehole wall, which ranges from 3 to 9 inches and typically varies from 5 to 7 inches. This allows the flexibility to provide a small annulus between the suppressor and the borehole wall to lower the device into the hole but still cover over 90% of the cross-sectional area.

In any embodiment of the invention, the absorptive material can vary in type so long as it has the ability to absorb acoustic energy and has limited compressibility.

In one embodiment of this invention, a compressible absorptive material and a detection means for detecting acoustic waves can be contained in a housing and placed in a tubular member. The tubular member can be the element which will contain the absorptive material and the detection means. The elements can vary from a borehole in the earth's surface, to a well casing, to housing for the material and detection means. In this embodiment, a detection means such as a series of acoustic wave detectors can be attached to a positioning means such as a wireline or cable. The compressible absorptive material can be placed on the positioning means at locations that would cause any tube waves to encounter the absorptive material and be suspressed before the waves are detected by the detection means. The detection means, compressible absorptive material and positioning means can be placed in a non-metal tubular element that will provide protection for the detection means, the compressible absorptive material and positioning means.

Another embodiment of the invention uses an absorptive material that has the capability of maintaining its shape and integrity under high temperature and pressure. This material does not need to be placed in a housing before being placed in a borehole. The material in this embodiment can be a plurality of acoustic dampeners attached to each other. An example could be a plurality of cork disks that have been attached together. In addition, a suspension means can be attached directly to the outer surface of the material. A modular embodiment of this invention can be implemented using modules of this material concatenated together.

Another embodiment of the invention comprises a method for suppressing tube-waves in a borehole. In this method, a material having limited compressibility and the capability to absorb acoustic signals is adapted to be placed in a borehole. This adaption is done by determining physical shape, length and diameter of the material. A means for suspending the material in the borehole is attached to the material before placing the material in the borehole A suspension means could be a container to hold the material and a wireline connected to equipment at the surface. The material is placed in the borehole between a source or receiver and the anticipated tube-waves. This method is especially useful with hydrophone-streamers. The absorptive material could be attached around the streamer cable at a location between the hydrophones and any anticipated tube waves. One method of attachment could be to surround the cable with two portions of the material attaching the two portions to each other.

Another embodiment of this method an include an additional step of determining the direction the tube waves are traveling in a borehole. Once the tube wave direction has been determined, the material can be placed in the borehole at a location between the receivers or source and any anticipated tube waves. For example, if tube waves are determined to travel up the borehole, the material could be placed in the borehole at a location below the receivers to intercept and suppress the tube waves.

Unlike CGG or Bolt Technology, this tube wave suppressor device does not rely on foam or gas, both of which can be highly compressible. The compressibility of the cork disks was tested at 5000 psi for 1 hour, which represents approximately the maximum pressure in a borehole the suppressor would be exposed to at 10,000 ft. The disks showed an average decrease in diameter of 12% immediately after the test. The cork balls showed a comparable change under the same test conditions. Another feature of the device is that the borehole fluid, normally water, may move freely through the device and there is no pressure differential on the walls of the CPVC pipe housing. This contrasts the Bolt device, which could conceivably have a pressurizing malfunction downhole, which could cause a rupture or explosion of the bladder.

In addition to using cork, a new material, Sorbothane, has been incorporated as a suppression material. It has the consistency of very soft rubber, and is poured into sections of the same type of CPVC pipe used for cork. Plugs, FIGS. 3a and 3b are used to plug the CPVC pipe housing to hold the Sorbothane when it is first poured into the pipe. Once the Sorbothane sets, the plugs are removed. The Sorbothane adheres to the inner surface of the pipe and fills the holes in the sides, thereby making the Sorbothane less compressible overall at depth. Also, a similar array of materials from Geltech Inc., Newport Beach, Calif. are reported to possess the characteristics of limited compressibility and the capability of absorbing acoustic signals. These are Alpha Gel, Beta Gel and Gamma Gel; all are very soft solid gel materials that are presently used for acoustic damping and vibration isolation. These materials are novel in that they have outstanding damping properties but heretofore have not been used for tube wave suppression.

Figure 6:
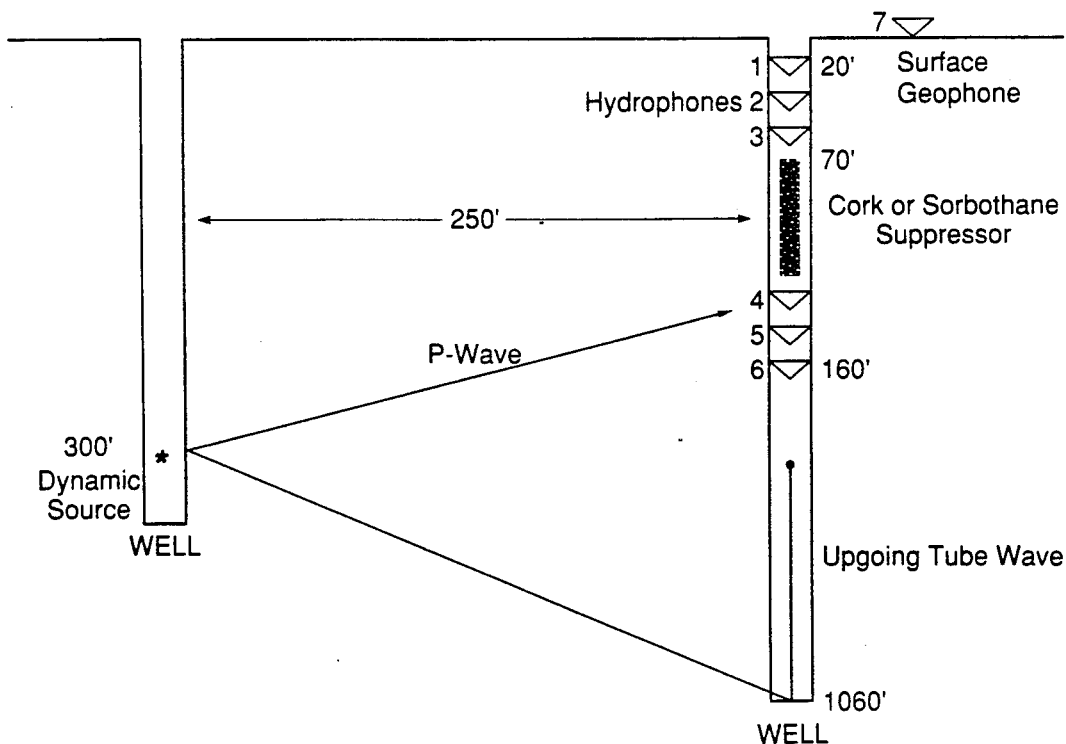
FIG. 6 Experimental implementation of the device.
Figure 7:
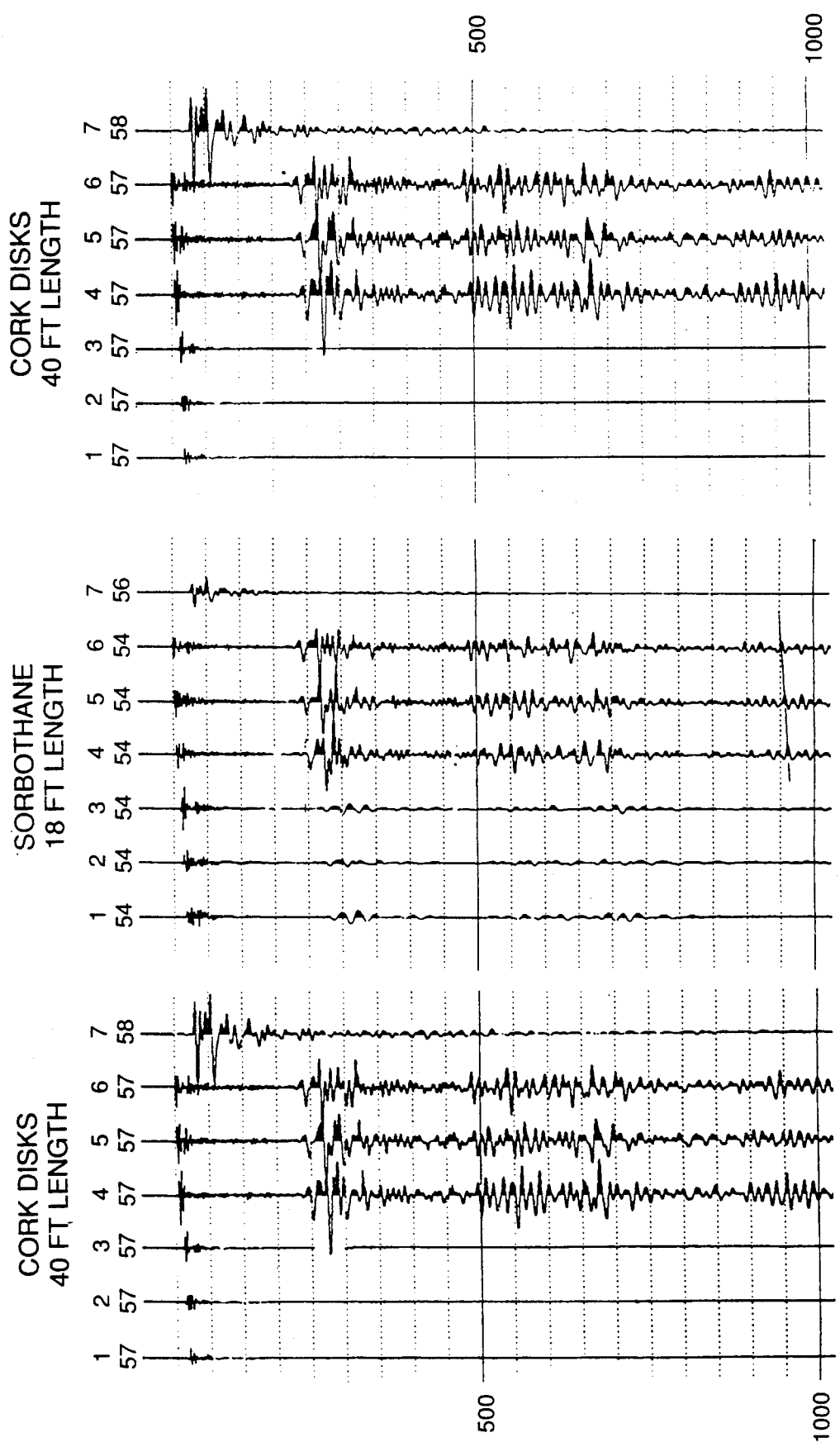
FIG. 7 Results of experimental implementation using the device.
Figure 8:
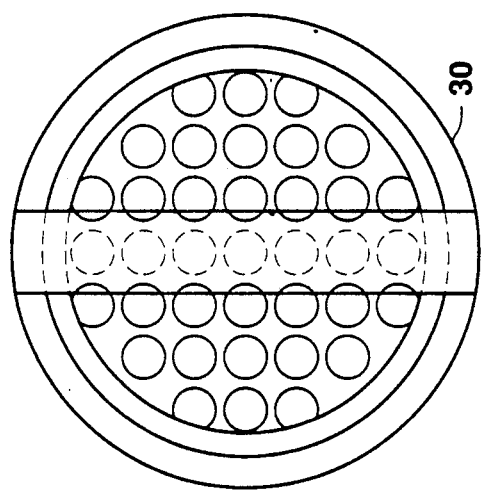
FIG. 8 View of the screen used in the embodiment of the device using cork balls.

The cork and Sorbothane devices described above have been built and field tested. FIG. 5 shows a preferred implementation of the device. The experiment setup in FIG. 6 shows three (3) evenly spaced hydrophones 1, 2, 3 in the borehole above the suppressor and three (3) hydrophones 4, 5, 6 below the suppressor, with a dynamite source in an adjacent well. FIG. 7 shows the results of the tests for a cork disk suppressor and a Sorbothane suppressor.

The 40-foot cork disk configuration, which is the preferred embodiment, gave the most overall attenuation. It suppressed over 95% of the tube wave over the frequency range of 25 Hz to 150 Hz. The 18-foot Sorbothane sections performed very well for frequencies from 100 Hz to 175 Hz with a reduction of the tube wave energy of greater than 95%.

The device of this invention provides significant advantages over the current devices. This device has been described in connection with its preferred embodiments. However, it is not limited thereto. Changes and modifications to the basic design will be obvious to those skilled in the art having the benefit of the foregoing teachings. All such changes and modifications are intended to be within the scope of the invention which is limited only by the following claims.

What is claimed is:

1. An acoustic wave suppression device for suppressing tube waves in a borehole comprising:
    a. a non-metal tubular housing, for containing a compressible absorptive material, having an outer surface and two ends;
    b. a compressible absorptive solid material contained in the housing for absorption of tube waves;
    c. an absorptive solid material covering the outer surface of the housing to reduce tube wave propagation between the non-metal housing and a borehole wall; and
    d. a means attached to the outer surface of the housing for suspending in a borehole the compressible absorptive material contained in the housing.

2. The device of claim 1 wherein the housing for containing the absorptive material comprises a plurality of generally tubularly shaped modular housing sections which are concatenated together.

3. A downhole tube-wave suppression device comprising:
    a. perforated non-metal housing having an outer surface and a longitudinal bore therethrough;
    b. a compressible solid material placed in the bore of the housing for absorption of tube waves;
    c. a solid compressible material covering the outer surface of the housing; and
    d. a means attached to the outer surface of the housing for suspending the housing in the borehole.

4. An acoustic wave suppression device for suppressing tube-waves comprising:
    a. a detection means for detecting acoustic waves, the means for detecting acoustic waves to be placed in a tubular member;
    b. a positioning means attached to the detection means for positioning the detection means in the tubular member;
    c. a compressible solid material attached to the positioning means in a location such that when the positioning means is placed in a tubular member, the compressible solid material will be located between the detection means and the tube-waves desired to be suppressed;
    d. an absorptive solid material covering the outer surface of the housing; and
    e. a borehole tubular member for containing the detection means, the positioning means and the compressible solid material.

* * * * *